United States Patent
McDonald et al.

[11] Patent Number: 5,890,342
[45] Date of Patent: Apr. 6, 1999

[54] WEIGHT ADJUSTING APPARATUS

[75] Inventors: Ian William McDonald; James Ian McDonald, both of Wells, England

[73] Assignee: Food Machinery Design Limited, England

[21] Appl. No.: 984,503

[22] Filed: Dec. 3, 1997

[30] Foreign Application Priority Data

Dec. 3, 1996 [GB] United Kingdom .................... 9625084

[51] Int. Cl.⁶ ...................................................... B65B 57/04
[52] U.S. Cl. ..................................... 53/54; 53/502; 53/66; 53/518; 83/73
[58] Field of Search .............................. 198/464.1, 463.1, 198/444; 53/54, 502, 503, 504, 66, 513, 518; 83/58, 61, 73

[56] References Cited

U.S. PATENT DOCUMENTS

| | | | |
|---|---|---|---|
| 3,667,520 | 6/1972 | Flesch | 209/645 |
| 4,136,504 | 1/1979 | Wyslotsky | 53/502 |
| 4,632,254 | 12/1986 | Scopatz | 53/502 |
| 5,324,529 | 6/1994 | Brockwell | 53/518 |
| 5,383,561 | 1/1995 | Tokutu | 209/645 |
| 5,749,204 | 5/1998 | Bokelmann et al. | 53/518 |

FOREIGN PATENT DOCUMENTS

| | | | |
|---|---|---|---|
| 2058353 | 6/1993 | Canada | G05D 15/01 |
| 0 270 697 A1 | 6/1988 | European Pat. Off. | B26D 7/01 |
| 0 500 478 A1 | 8/1992 | European Pat. Off. | B26D 7/30 |
| 2276950 | 10/1994 | United Kingdom | B26D 7/30 |

Primary Examiner—James F. Coan
Assistant Examiner—Gene L. Kim
Attorney, Agent, or Firm—Bacon & Thomas, PLLC

[57] ABSTRACT

Apparatus for reducing the mean weight of articles of a soft material, for example cheese, in a flow (1), including a first weighing device (2) for weighing the articles; a flow splitter for splitting the flow (1) into a first flow (3) of articles with individual weights less than an acceptable minimum, a second flow (5) each with a weight greater than the acceptable minimum but less than a predetermined amount in excess, and a third flow (4) each with a weight above the acceptable minimum plus the predetermined amount in excess; a cutter (6) for removing the predetermined amount of material from each of the articles in the third flow (4); a second weighing device (8) for weighing individual articles in the second flow (5) and those in the flow (7) leaving the cutter (6); and a controller for controlling the splitting of the original flow leaving the first weighing device (2) into the respective first, second and third flows.

8 Claims, 1 Drawing Sheet

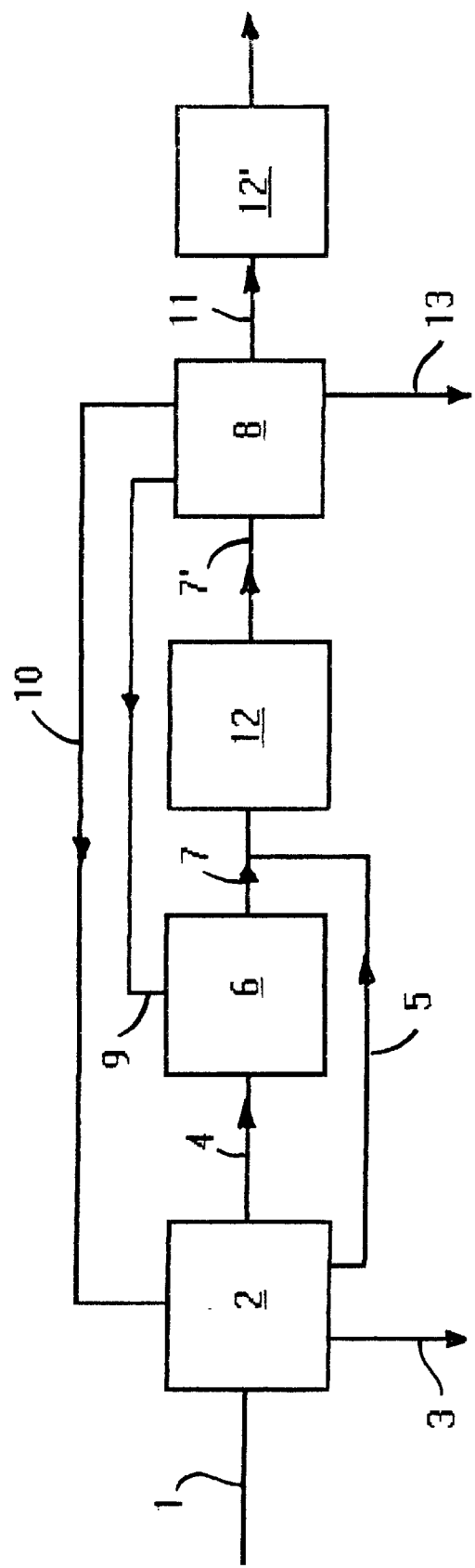

WEIGHT ADJUSTING APPARATUS

This invention concerns weight adjusting apparatus, and more particularly weight adjusting apparatus including means for reducing the mean weight of individual articles in a flow of articles of a soft material, for example cheese. The invention further includes packaging machines incorporating weight adjusting apparatus in accordance with the present invention.

The cutting of individual amounts of a material, for example cheese, from larger amounts of the material for sale is commonplace. When carried out by hand this process has at best been approximate, the actual weight of cut material often differing widely from the desired weight, even when the procedure is carried out by an experienced person.

Mechanisation of such cutting operations can significantly improve the accuracy of cutting so that the resulting individual cut articles more nearly conform to a desired weight. However, weight variations can, and do, still occur as the cutting operation is usually based on assumptions as to the density of the material and also the shape and dimensions of the larger amount of the material from which the individual articles are cut. An example of this is natural cheese.

Natural cheese is a semi-solid product which is often manufactured in large blocks, typically 10 to 30 kg each. These blocks are stored for maturation of the cheese, and during this process distortions of the blocks occur as a result of the semi-plastic nature of the cheese. This results in changes in the dimensions of the blocks from their original dimensions. Furthermore, the bulk density of the cheese itself changes throughout the manufacturing and maturation processes. Indeed, the density of the cheese can vary from block to block and indeed even within an individual block.

Increasingly cheese is being sold as individual pre-packs which have been produced at a central packaging station, and although much is sold as random weight packs with the actual weight specified on the packs, there is an increasing demand for fixed weight packs. As will be appreciated, density and size variations of the blocks makes producing fixed weight packs from them a particular problem.

Trying to cut fixed weight portions from blocks with different weights, different dimensions and different densities to produce packs containing a particular amount of cheese inevitably leads to the production of blocks having a distribution of weights about a mean. In order to comply with national and international legislation on pack weights, the practice has usually been to cut individual packs to a high mean weight in order to ensure that the legal requirements are met by most of the packs and to reduce under weight packs to a minimum since the latter usually have to be disposed of at a financial loss. However, increasing the mean weight of the packs results in a financial loss to the producer and a gain to the consumer. Even relatively small percentage increases in mean weight have associated decreases in profit for the manufacturer and/or retailer. Cheese cutting systems have been proposed hitherto which measure, weigh and calculate the bulk densities of blocks of cheese and then move cutter wires which are used to cut the cheese in an attempt to effect accurate cutting of the blocks. However, bulk density variations within individual blocks and non-parallel sides to the blocks results in inaccurate cutting, final accuracies of less than 1 to 1.5% over the desired mean seldom being achieved.

According to the present invention there is provided apparatus for reducing the mean weight of articles in a flow of articles of a soft material from an original mean weight to a reduced mean weight, the apparatus comprising;

(a) first weighing means for weighing individual articles in the flow;
(b) flow splitter means for splitting the flow of weighed articles into:
  (i) a first flow of articles each with an individual weight less than an acceptable minimum weight;
  (ii) a second flow of articles each with a weight greater than the acceptable minimum weight but less than a predetermined amount in excess thereof; and
  (iii) a third flow of articles each with a weight above the acceptable minimum weight plus said predetermined amount in excess thereof;
(c) cutter means for removing the predetermined amount of material from each of the articles in the said third flow;
(d) second weighing means for weighing individual articles in the said second flow and those in the flow of articles leaving the cutter means; and
(e) control means for controlling the splitting of the original flow of articles leaving the first weighing means into the respective first, second and third flows of articles.

Instead of trying to cut large blocks of a material such as cheese directly into portions of a desired weight, the present invention enables the mean weight of a feed of individual portions having a mean weight above that which is desired to be reduced to a mean weight which is nearer to the desired mean or minimum. The apparatus trims material from at least some of the portions to reduce their weight, and thereby the mean weight of the combined flow of portions, those which are to be trimmed being determined by the output of a check weigher which weighs the portions after some have been trimmed.

The control means preferably diverts articles from the said third flow to the second flow when the mean weight of articles reaching the second weighing means is less than or equal to the said reduced mean weight. Furthermore, it is generally preferred that individual articles with a weight less than the acceptable weight are removed from the flow of articles which are fed to the second weighing means.

Apparatus according to the present invention preferably includes packaging means for packaging the articles in the said second flow and the flow leaving the cutter means before the articles are weighed by the second weighing means. However, it is particularly preferred to include packaging means for packaging the articles leaving the second weighing means.

Adjustment of the amount of material cut from each article in the said third flow is effected by the control means. Substantially the same amount of material can be cut from each of the articles fed to the cutter means, or the control means can adjust the said amount cut from each of the articles in the said third flow.

An embodiment of apparatus in accordance with the present invention will now be described with reference to the accompanying diagrammatic drawing which is a block diagram thereof, and in particular in the production of packages of cheese from larger blocks thereof.

Individual portions of cheese 1 are cut from large blocks of cheese by a cheese cutter device (not shown) to produce a flow of individual cheese portions having a distribution of individual weights about an original mean weight, this original mean weight being above a final desired mean weight.

The flow of cheese portions is fed to a first check weigher 2 where the flow is split into three separate flows, a reject flow 3 consisting of portions below a minimum acceptable weight for individual portions, an acceptable flow 5 of portions each with a weight above the minimum acceptable weight but less than a predetermined amount above the minimum acceptable weight, and a flow 4 of portions to be trimmed.

The flow 4 of portions to be trimmed is fed to a cutter 6 where the predetermined amount of each portion is cut off. The flow of portions from the first check weigher 2 and the amount which is trimmed from each portion by the cutter 6 is under the control of a second check weigher 8, in accordance with the mean weight of the cheese portions which are fed to it above the minimum acceptable weight.

A signal from the second check weigher 8 along a control line 9 is used to control the amount of cheese cut by the cutter 6. A further signal from the second check weigher 8 fed along a control line 10 is used to control the first check weigher 2 and thereby control the relative split of the portions between the flows 4 and 5. Thus the weight of the individual portions which are fed to the cutter 6 can be controlled, as can the amount of trimming effected by the cutter 6. This embodiment of apparatus in accordance with the present invention can therefore be used to effect a particularly flexible control over the adjustment of the mean weight of the portions leaving in exit flow 11. However, as will be appreciated by those skilled in the art, the cutter 6 can be used to cut substantially the same amount from every portion fed to it, control of the reduced mean weight of the portions leaving the second check weigher 8 in exit flow 11 being effected by controlling the relative split of portions in flows 4 and 5.

If the mean weight of portions above the minimum acceptable weight which reach the second check weigher 8 is less than the desired reduced mean, the second check weigher 8 sends a control signal to the first check weigher 2 to divert portions from flow 4 to flow 5 until the portions passed by the check weigher 8 to the exit flow 11 increases to at least the desired reduced mean weight.

The apparatus illustrated in the accompanying drawing includes a packaging machine 12 between the cutter 6 and the second check weigher 8. This enables packs of product to be check weighed before they are passed to the exit flow 11. However, there can be advantage in locating the packaging machine after the second check weigher 8, as shown at 12', this allowing the second check weigher 8 to reject portions of cheese fed to it as being under or over a desired weight before they are packaged.

As will also be appreciated by those skilled in the art, although the present invention has particular applicability in adjusting the weight portions of cheese cut from a larger block so that the resulting portions have a mean weight nearer to a desired value, it can also be used to adjust the mean weight of portions of other soft materials, and especially those where the trimmed material can be recycled and/or reclaimed.

The cutter 6 can effect the cutting operation in various ways depending on the material being cut. In the case of cheese it can effect cutting using one or more wires, a fixed, oscillating or rotating blade, a band saw, water or other liquid jet, or a rotating planer.

The cutter 6 can be set to cut a fixed thickness from each of a number of portions fed to it from the first check weigher 2, with control via the control line 9 being used to make adjustments of the thickness of cut to all subsequent portions to bring the mean weight of the trimmed portions closer to the desired mean portion weight. The cutter 6 can also be of a type which includes a number of pathways for individual portions to effect differing amounts of trimming according to the selected pathway, selection of the pathway being determined by the weight of an individual portion as weighed by the first check weigher 2 and the mean weight of the output flow of portions, whether packaged or not, leaving in the exit flow 11.

I claim:

1. Apparatus for reducing the mean weight of articles in a flow of articles of a soft material from an original mean weight to a reduced mean weight, the apparatus comprising;
   (a) first weighing means for weighing individual articles in the flow;
   (b) flow splitter means for splitting the flow of weighed articles into:
      (i) a first flow of articles each with an individual weight less than an acceptable minimum weight;
      (ii) a second flow of articles each with a weight greater than the acceptable minimum weight but less than a predetermined amount in excess thereof; and
      (iii) a third flow of articles each with a weight above the acceptable minimum weight plus said predetermined amount in excess thereof;
   (c) cutter means for removing the predetermined amount of material from each of the articles in the said third flow;
   (d) second weighing means for weighing individual articles in the said second flow and those in the flow of articles leaving the cutter means; and
   (e) control means for controlling the splitting of the original flow of articles leaving the first weighing means into the respective first, second and third flows of articles.

2. Apparatus according to claim 1, wherein the control means can divert articles from the said third flow to the second flow when the mean weight of articles reaching the second weighing means is less than the said reduced mean weight.

3. Apparatus according to claim 1, including means for removing from the flow of articles to the second weighing means individual articles with a weight less than the acceptable mean weight.

4. Apparatus according to claim 1, including packaging means for packaging the articles in the said second flow and the flow leaving the cutter means before the articles are weighed by the second weighing means.

5. Apparatus according to claim 1, including packaging means for packaging the articles leaving the second weighing means.

6. Apparatus according to claim 1, wherein the control means can adjust the said predetermined amount of material cut from each article in the said third flow.

7. Apparatus according to claim 6, wherein the cutter means once set cuts substantially the same amount of material from each of the articles fed to it.

8. Apparatus according to claim 1, wherein the control means can adjust the said predetermined amount cut from each of the articles in the said third flow.

* * * * *